United States Patent [19]

Funahashi et al.

[11] Patent Number: 4,994,662
[45] Date of Patent: Feb. 19, 1991

[54] RADIATION IMAGE READ-OUT APPARATUS AND METHOD FOR OPERATING THE SAME

[75] Inventors: Takeshi Funahashi; Kazuhiro Hishinuma, both of Kanagawa, Japan

[73] Assignee: Fuji Photo Film Co., Ltd., Kanagawa, Japan

[21] Appl. No.: 508,677

[22] Filed: Apr. 12, 1990

[30] Foreign Application Priority Data

Apr. 14, 1989 [JP] Japan .................................. 64-94902

[51] Int. Cl.$^5$ .............................................. H01J 40/14
[52] U.S. Cl. .................................. 250/208.1; 250/337; 250/235
[58] Field of Search ....................... 250/208.1, 235, 236, 250/234, 337, 208.2; 358/213.27

[56] References Cited

U.S. PATENT DOCUMENTS

| | | |
|---|---|---|
| 3,859,527 | 1/1975 | Luckey ............................. 250/337 |
| 3,975,637 | 8/1976 | Ikedo et al. ....................... 250/337 |
| 4,258,264 | 3/1981 | Kotera et al. . |
| 4,276,473 | 6/1981 | Kato et al. . |
| 4,315,318 | 2/1982 | Kato et al. . |
| 4,387,428 | 6/1983 | Ishida et al. . |

FOREIGN PATENT DOCUMENTS

56-11395 2/1981 Japan .
61-5193 2/1986 Japan .

Primary Examiner—David C. Nelms
Attorney, Agent, or Firm—Sughrue, Mion, Zinn, Macpeak & Seas

[57] ABSTRACT

A radiation image read-out apparatus comprises a preliminary read-out device, a final read-out device, an image processor, and a condition adjuster. The condition adjuster comprises an operating device for determining the read-out conditions for the final readout and/or the image processing conditions and feeding the information about them into the final read-out device and/or the image processor. From a first input device, information about a mode selected from among several modes of adjusting the read-out conditions and/or the image processing conditions is fed into the operating device. In cases where a region selecting mode is designated, an image represented by a preliminary read-out image signal is displayed. From a second input device, information about a region on a stimulable phosphor sheet, for which the read-out conditions and/or the image processing conditions are to be set, information a desired reproduced image density, and information about a desired image signal range are fed into the operating device.

9 Claims, 8 Drawing Sheets

RADIATION IMAGE READ-OUT APPARATUS AND METHOD FOR OPERATING THE SAME

BACKGROUND OF THE INVENTION

1. Field of the Invention

This invention relates to a radiation image read-out apparatus wherein an image signal is obtained by reading out a radiation image of an object from a recording medium, such as a stimulable phosphor sheet or photographic film, on which the radiation image has been recorded, and image processing is carried out on the image signal. This invention also relates to a method for operating the radiation image read-out apparatus.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used to reproduce the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal (image signal) to be used in the reproduction of a visible image on a recording material, such as photographic film, or on a display device, such as a CRT.

In order for an image signal to be detected accurately, certain factors which affect the image signal must be set in accordance with the dose of radiation delivered to the stimulable phosphor sheet and the like. Novel radiation image recording and reproducing systems which accurately detect an image signal have been proposed. The proposed radiation image recording and reproducing systems are constituted such that a preliminary read-out operation (hereinafter simply referred to as the "preliminary readout") is carried out in order approximately to ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed in the main scanning direction or in the sub-scanning direction.

Regardless of whether the preliminary readout is or is not carried out, it has also been proposed to analyze the image signal (including the preliminary readout image signal) obtained and to adjust the image processing conditions, which are to be used when the image signal is processed, on the basis of the results of an analysis of the image signal. The proposed method is applicable to cases where an image signal is obtained from a radiation image recorded on a recording medium such as conventional X-ray film, as well as to systems using stimulable phosphor sheets.

In the course of adjusting the read-out conditions for the final readout and/or the image processing conditions, various modes are often used. For example, a mode is used in which a histogram (or a probability density function) of the image signal (or the preliminary read-out image signal) is created, and the read-out conditions for the final readout and/or the image processing conditions are determined automatically from the histogram each time the image signal is detected. In another mode, a mean-level value, such as the mean value, the median value, or the like of the image signal (or the preliminary read-out image signal) corresponding to the whole are or a partial region on the recording medium is calculated, and the read-out conditions for the final readout and/or the image processing conditions are determined from the mean-level value. (The mean-level value will hereinafter be often referred to as the "mean value". This mode will hereinafter be referred to as the "mean value operating mode". Also, the region for which the mean value is calculated will hereinafter be referred to as the mean value operating region".) In a further mode, the readout conditions for the final readout and/or the image processing conditions are determined and stored in advance for various characteristics of recorded images. Such characteristics include, for example, what portion of an object is represented by the recorded image (e.g., the head, the chest, or the abdomen in cases where the object is a human body) and what mode was used when the image was recorded (e.g., an ordinary image recording mode, a contrasted image recording mode, or an enlarged image recording mode). A mode is also used in which factors important in determining the read out conditions for the final readout and/or the image processing conditions are designated manually each time the conditions are to be determined. However, every mode of adjusting the read-out conditions for the final readout and/or the image processing conditions has advantages and drawbacks. Therefore, various modes are used in combination such that their drawbacks can be compensated for.

The aforesaid mean value operating mode includes a mode of selecting a region from a plurality of mean value operating regions. The region selecting mode will hereinbelow be described in detail.

Figure 3:
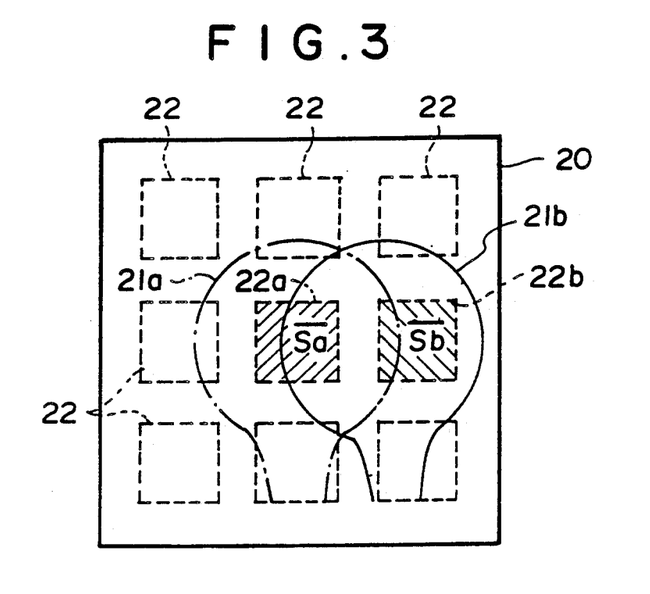
FIG. 3 is an explanatory view showing an object image (radiation image) stored on a stimulable phosphor sheet.

FIG. 3 is an explanatory view showing an object image (radiation image) stored on a stimulable phosphor sheet and a plurality of (in this example, nine) mean value operating regions which are set in the mean value operating mode.

With reference to FIG. 3, an object image 21a (radiation image) of the head of a human body is stored at approximately the center portion of a stimulable phosphor sheet 20. Therefore, in this case, a mean value operating region 22a, which is located at the center among a plurality of mean value operating regions 22, 22, . . . is selected. A calculation is made to find the mean value $\overline{Sa}$ of the image signal (or the preliminary read-out image signal) corresponding to the mean value operating region 22a. Thereafter, information about a desired reproduced image density D0 and information about a desired image signal range L are entered manually into the radiation image read-out apparatus. The information about the desired reproduced image density D0 designates which level of image density in a reproduced visible image the mean value $\overline{Sa}$ should have. The information about the desired image signal range L designates which range of the image signal including the mean value $\overline{Sa}$ is to be used in the reproduction of a visible image (i.e. which contrast the reproduced visible image should have). The read-out conditions for the final readout and/or the image processing conditions are determined from the mean value $\overline{Sa}$, the desired reproduced image density D0, and the desired image signal range L. The final readout is carried out under the determined read-out conditions, and/or the image processing is carried out under the determined image processing conditions. Thereafter, a visible image having the desired image density and contrast is reproduced.

Figure 6:
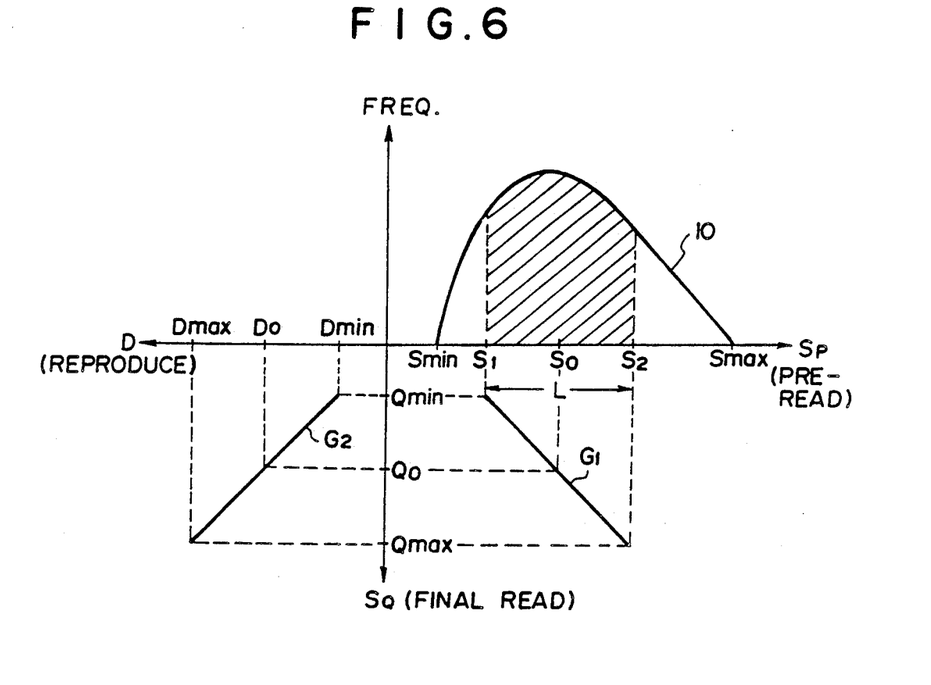
FIG. 6 is a graph showing the relationship between the preliminary read-out image signal obtained during a preliminary readout, the image signal obtained during a final readout, and the image density of a visible image reproduced from the image signal.

FIG. 6 is an explanatory graph showing the relationship between the mean value $\overline{Sa}$, the desired reproduced image density D0, and the desired image signal range L. This graph is for the case where a preliminary readout is carried out. The values of the preliminary read-out image signal SP, which were obtained during the preliminary readout, are plotted on the horizontal axis at the right part of the graph. The frequency of occurrence of the values of the preliminary read-out image signal SP, which were detected from, for example, the whole surface of the stimulable phosphor sheet 20 shown in FIG. 3, is plotted on the vertical axis at the upper part of the graph. The values of the image signal SQ obtained during the final readout are plotted on the vertical axis at the lower part of the graph. The image density level D of a visible image reproduced from the image signal SQ is plotted o the horizontal axis at the left part of the graph.

In FIG. 6, a probability density function 10 represents the frequency of occurrence of the values of the preliminary read-out image signal SP, which were detected from the whole surface of the stimulable phosphor sheet 20. The probability density function 10 ranges from the maximum value Smax to the minimum value Smin. Also, the mean value $\overline{Sa}$ of the preliminary readout image signal SP corresponding to the region inside of the mean value operating region 22a shown in FIG. 3 corresponds to the level S0 shown in FIG. 6. In such cases, when a desired image signal range L, which defines the image signal range from S1 to S2, including S0, is designated, the read-out conditions for the final readout are set so that during the final readout the minimum image signal value Qmin and the maximum image signal value Qmax are obtained respectively from the picture elements represented by the values S1 and S2 of the preliminary read-out image signal SP. Specifically, the read-out conditions for the final readout are set so that during the final readout the image information represented by values of the emitted light signal falling within the range of S1 to S2 is detected as an image signal having values lying on the straight line G1 shown in FIG. 6. From the image signal SQ obtained under the read-out conditions for the final readout, a visible image is reproduced such that the image signal value Q0 corresponding to the value S0 of the preliminary read-out image signal SP yields a desired reproduced image density D0 in the reproduced visible image and the minimum image signal value Qmin and the maximum image signal value Qmax of the image signal SQ correspond respectively to the minimum image density Dmin and the maximum image density Dmax within the predetermined correct image density range of the reproduced visible image. Specifically, a visible image is reproduced such that the values of the image signal SQ falling within the range of Qmin to Qmax correspond to the image density levels lying on the straight line G2 shown in FIG. 6. As described above, in the mean value operating mode (region selecting mode), the mean value S0 is calculated. Also, as the desired image signal range L and the desired reproduced image density D0 are designated, a visible image having appropriated image density and contrast can be reproduced.

In the radiation image read-out apparatus wherein various modes, including the region selecting mode, are used as the modes of adjusting the read-out conditions for the final readout and/or the image processing conditions, when the region selecting mode is to be used, information designating the region selecting mode and information about the mean value operating region, which is to be selected from among a plurality of mean value operating regions (i.e. information about at which part of the recording medium an object image is present), are entered by an operator into the radiation image read-out apparatus. Also, the desired reproduced image density D0 and the desired image signal range L are designated by the operator. After these items of information are entered into the radiation image read-out apparatus, the radiation image is read out from the recording medium.

However, it often occurs that the position on the recording medium at which an object image (radiation image) is actually recorded deviates from a position intended during the recording of the radiation image. For example, it often occurs that, even though an operator carried out a radiation image recording operation with the intention of recording an object image (radiation image) at the center portion of a recording medium, the object image is actually recorded at a portion of the recording medium outside of its center portion. By way of example, as shown in FIG. 3, it often occurs that, in cases where an object image is actually recorded at the position indicated by the solid line 21b, the operator considers by mistake that the object image 21a is recorded at the center portion of the stimulable phosphor sheet 20 and designates the mean value operating region 22a as the region for which the mean value of the image signal is to be calculated. In such cases, the mean value $\overline{Sa}$ of the image signal (or the preliminary read-out image signal) corresponding to the designated mean value operating region 22a is calculated. However, the calculated mean value $\overline{Sa}$ will often be markedly different from the correct mean value of the image signal representing the object image. Because the image density level of a visible image reproduced from the image signal is set based on the incorrect mean value $\overline{Sa}$, a reproduced visible image is obtain which has an inappropriate image density, for example, a very low image density.

SUMMARY OF THE INVENTION

The primary object of the present invention is to provide a radiation image read-out apparatus wherein a correct mean value operating region is designated even if an object image was recorded at a position different from an intended position on a recording medium.

Another object of the present invention is to provide a radiation image read-out apparatus which enables a visible image having an appropriate image density level and an appropriate contrast to be reproduced.

The specific object of the present invention is to provide a method for operating the radiation image read-out apparatus.

Figure 1A:
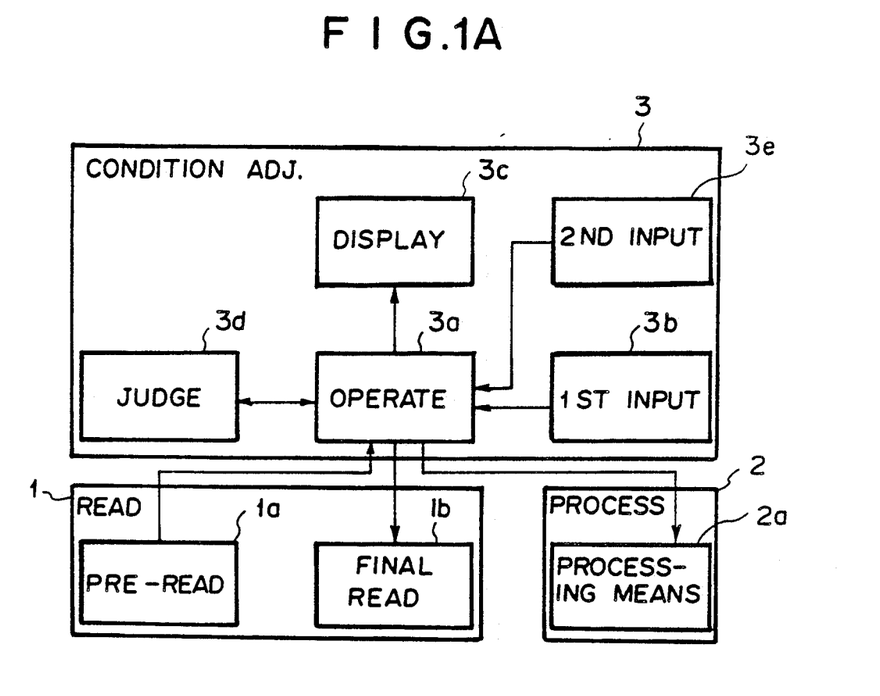
FIG. 1A is a block diagram showing the general configuration of the first radiation image read-out apparatus in accordance with the present invention.

FIG. 1A is a block diagram showing the general configuration of the first radiation image read-out apparatus in accordance with the present invention.

With reference to FIG. 1A, the first radiation image read-out apparatus in accordance with the present invention comprises a read-out section 1, an image processing section 2, and a condition adjusting section 3.

The read-out section 1 is provided with a preliminary read-out means 1a for carrying out a preliminary read-out operation wherein a stimulable phosphor sheet having a radiation image stored thereon is exposed to stimulating rays, which cause said stimulable phosphor sheet to release part of energy stored thereon during its exposure to radiation as light emitted in proportion to the amount of said stored energy, and the emitted light is detected, and obtaining a preliminary read-out image signal which approximately represents said radiation image, and a final read-out means 1b for carrying out a final read-out operation wherein said stimulable phosphor sheet is exposed to stimulating rays having an energy level higher than that of said stimulating rays used during the preliminary read-out operation, and light emitted by said stimulable phosphor sheet during its exposure to the stimulating rays is detected, and obtaining a final read-out image signal which represents said radiation image.

The image processing section 2 is provided with an image processing means 2a for carrying out image processing on said final read-out image signal.

The condition adjusting section 3 is provided with a plurality of modes of adjusting read-out conditions for the final read-out operation and/or image processing conditions to be used during the image processing, including a region selecting mode, said adjustment being effected on the basis of a mean-level value of said preliminary read-out image signal corresponding to a single region selected from among a plurality of regions on said stimulable phosphor sheet. In the condition adjusting section 3, the read-out condition for the final read-out and/or the image processing conditions are determined in a mode selected from among the plurality of said modes of adjusting the read-out conditions for the final readout and/or the image processing conditions.

Said condition adjusting section 3 is constituted of:
(a) a condition operating means 3a for determining the read-out conditions for the final readout and/or the image processing conditions and feeding the information about the determined read-out conditions for the final readout into said final read-out means 1b and/or feeding the information about the determined image processing conditions into said image processing means 2a, (b) a first input means 3b with which a mode selected from among the plurality of said modes of adjusting the read-out conditions for the final readout and/or the image processing conditions is designated, and from which the information about the designated mode is fed into said condition operating means 3a, (c) a display means 3c for displaying an image represented by said preliminary read-out image signal, (d) a judgment means 3d for judging whether said region selecting mode has been or has not been designated, and (e) a second input means 3e with which a region to be used during the determination of the read-out conditions for the final readout and/or the image processing conditions, said region being selected from among the plurality of said regions on said stimulable phosphor sheet, a desired reproduced image density D0 corresponding to the mean-level value of said preliminary read-out image signal corresponding to said region, and a desired image signal range L including said mean-level value are designated with the timing independent of the designation of a mode effected with said first input means 3b, and from which the information about said region, the information about said desired reproduced image density D0, and the information about said desired image signal range L are fed into said condition operating means 3a.

Figure 1B:
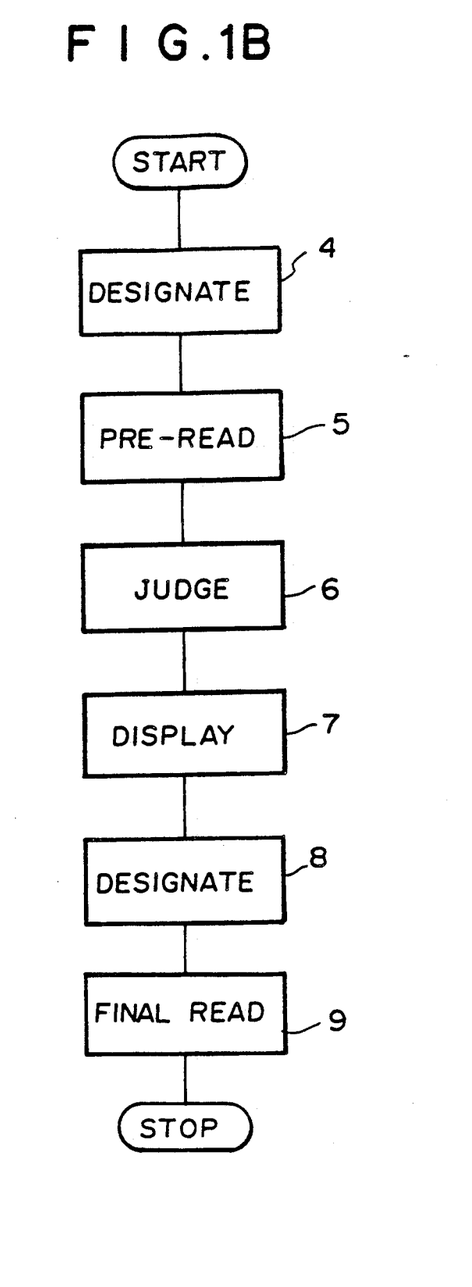
FIG. 1B is a flow chart showing how the first radiation image read-out apparatus in accordance with the present invention is operated.

FIG. 1B is a flow chart showing how the first radiation image read-out apparatus in accordance with the present invention is operated.

With reference to FIG. 1B, before the preliminary read-out operation is carried out, said region selecting mode is designated with said first input means 3b (step 4).

Thereafter, the preliminary read-out operation is carried out (step 5).

After the preliminary read-out operation is carried out, judgment is made by said judgment means 3d as to whether said region selecting mode has been or has not been designated (step 6).

In cases where it is judged by said judgment means 3d that said region selecting mode has been designated, an image represented by said preliminary read-out image signal is displayed on said display means 3c (step 7).

After the image is displayed, said region to be used during the determination of the read-out conditions for the final readout and/or the image processing conditions, said region being selected from among the plurality of said regions on said stimulable phosphor sheet, a desired reproduced image density D0 corresponding to the mean-level value of said preliminary read-out image signal corresponding to said region, and a desired image signal range L including said mean-level value are designated with said second input means 3e (step 8).

Thereafter, the final read-out operation is carried out (step 9).

The method for operating the first radiation image read-out apparatus in accordance with the present invention comprises the aforesaid steps.

The aforesaid method for operating the first radiation image read-out apparatus in accordance with the present invention is related only to the case wherein the region selecting mode is used. Therefore, methods for operating the first radiation image read-out apparatus in a mode other than the region selecting mode do not constitute the aforesaid method for operating the first radiation image read-out apparatus in accordance with the present invention.

In step 6, judgment is made as to whether the region selecting mode has been or has not been designated in the first radiation image read-out apparatus in accordance with the present invention. In cases where a mode other than the region selecting mode has been designated, step 7 is not carried out.

The radiation image read-out apparatus in accordance with the present invention may be constituted such that no preliminary readout is carried out, but the image processing conditions are determined from the image signal obtained during an image read-out operation corresponding to the final readout. Such radiation image read-out apparatus is applicable when a recording medium, such as photographic film, is used as well as when a stimulable phosphor sheet is used.

Figure 1C:
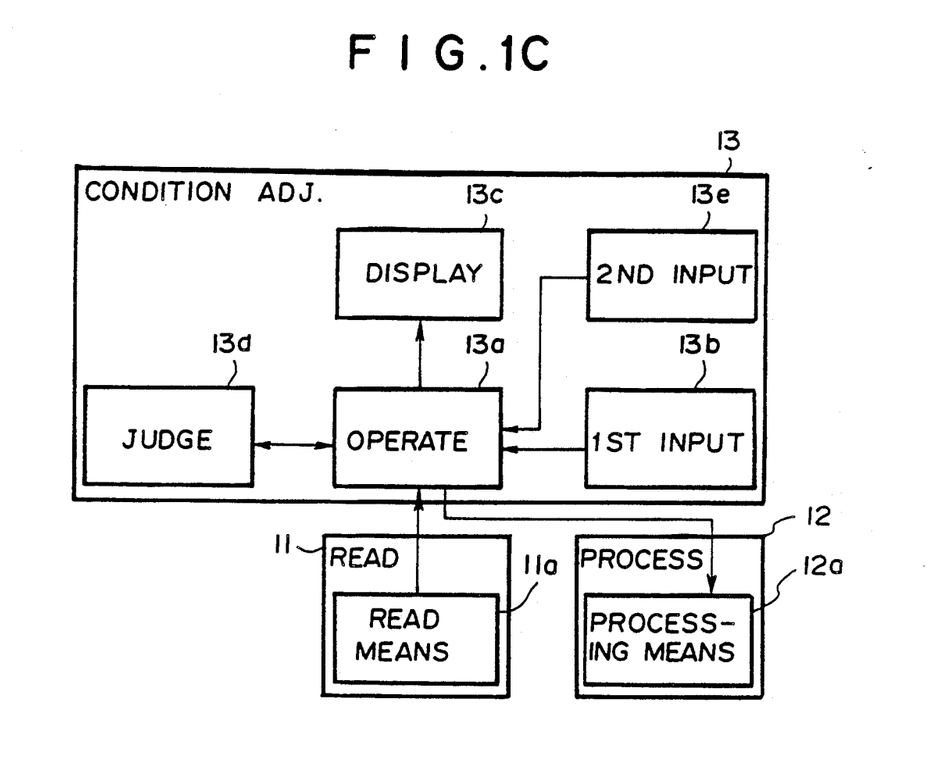
FIG. 1C is a block diagram showing the general configuration of the second radiation image read-out apparatus in accordance with the present invention.

FIG. 1C is a block diagram showing the general configuration of the second radiation image read-out apparatus in accordance with the present invention, wherein no preliminary readout is carried out.

Like the first radiation image read-out apparatus in accordance with the present invention, which is shown in FIG. 1A, the second radiation image read-out apparatus in accordance with the present invention shown in FIG. 1C comprises a read-out section 11, an image processing section 12, and a condition adjusting section 13.

However, the read-out section 11 has no preliminary read-out means, but is provided with only a read-out means 11a for carrying out a read-out operation wherein a radiation image is read out from a recording medium, such as a stimulable phosphor sheet or X-ray film, on which the radiation image has been recorded, and obtaining an image signal representing said radiation image. The read-out means 11a corresponds to the final read-out means 1b of the first radiation image read-out apparatus shown in FIG. 1A.

Like the image processing section 2 of the first radiation image read-out apparatus shown in FIG. 1A, the image processing section 12 is provided with an image processing means 12a for carrying out image processing on said image signal.

The condition adjusting section 13 has nearly the same configuration as the condition adjusting section 3 of the first radiation image read-out apparatus shown in FIG. 1A. However, unlike the condition adjusting section 3 which determines the read-out conditions for the final readout and/or the image processing conditions, the condition adjusting section 13 shown in FIG. 1C determines only the image processing conditions.

Specifically, the condition adjusting section 13 shown in FIG. 1C is constituted of:

(a) a condition operating means 13a for determining the image processing conditions and feeding the information about the determined image processing conditions into said image processing means 12a, (b) a first input means 13b with which a mode selected from among the plurality of said modes of adjusting the image processing conditions is designated, and from which the information about the designated mode is fed into said condition operating means 13a, (c) a display means 13c for displaying an image represented by said image signal, (d) a judgment means 13d for judging whether said region selecting mode has been or has not been designated, and (e) a second input means 13e with which a region to be used during the determination of the image processing conditions, said region being selected from among the plurality of said regions on said recording medium, a desired reproduced image density D0 corresponding to the mean-level value of said image signal corresponding to said region, and a desired image signal range L including said mean-level value are designated with the timing independent of the designation of a mode effected with said first input means 13b, and from which the information about said region, the information about said desired reproduced image density D0, and the information about said desired image signal range L are fed into said condition operating means 13a.

Figure 1D:
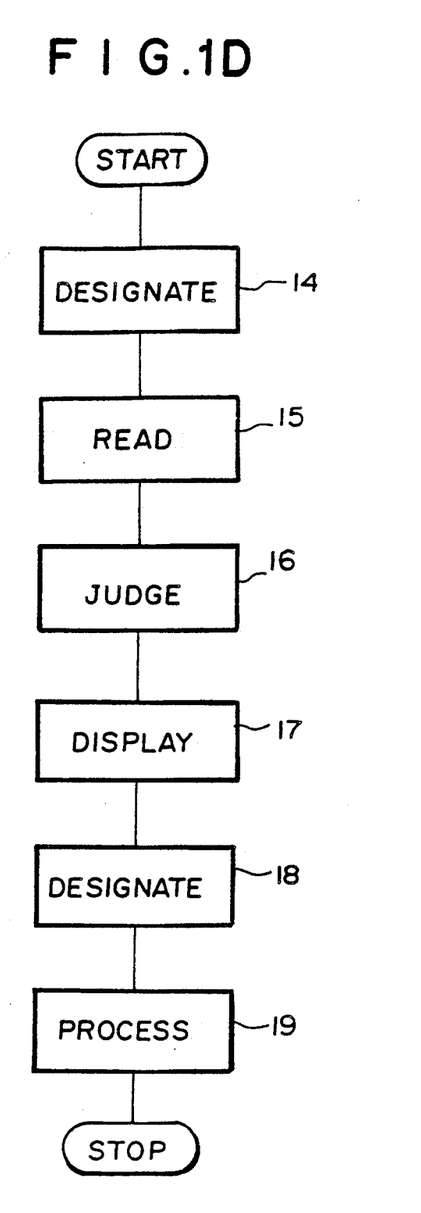
FIG. 1D is flow chart showing how the second radiation image read-out apparatus in accordance with the present invention is operated.

FIG. 1D is a flow chart showing how the second radiation image read-out apparatus in accordance with the present invention is operated.

With reference to FIG. 1D, before the read-out operation is carried out, said region selecting mode is designated with said first input means 13b (step 14).

Thereafter, the read-out operation is carried out (step 15).

After the read-out operation is carried out, judgment is made by said judgment means 13d as to whether said region selecting mode has been or has not been designated (step 16).

In cases where it is judged by said judgment means 13d that said region selecting mode has been designated, an image represented by said image signal is displayed on said display means 13c (step 17).

After the image is displayed, said region to be used during the determination of the image processing conditions, said region being selected from among the plurality of said regions on said recording medium, a desired reproduced image density D0 corresponding to the mean-level value of said image signal corresponding to said region, and a desired image signal range L including said mean-level value are designated with said second input means 13e (step 18).

Thereafter, the image processing is carried out (step 19).

The method for operating the second radiation image read-out apparatus in accordance with the present invention comprises the aforesaid steps.

Like the aforesaid method for operating the first radiation image read-out apparatus in accordance with the present invention, method for operating the second radiation image read-out apparatus in accordance with the present invention is related only to the case wherein the region selecting mode is used.

Effects of the first radiation image read-out apparatus and the method for operating the first radiation image read-out apparatus in accordance with the present invention will be described hereinbelow.

Analyses of procedures for obtaining a visible image revealed that, in cases where the region selecting mode is used in a radiation image read-out apparatus utilizing a plurality of modes of adjusting the read-out conditions for the final readout and/or the image processing conditions, including the region selecting mode, only the information about the use of the region selecting mode is necessary before the preliminary readout is carried out. The information about which mean value operating region is to be used among a plurality of mean value operating regions, the information about the desired image signal range L, and the information about the desired reproduced image density D0 may be designated after the preliminary readout has been carried out. The first radiation image read-out apparatus and the method for operating the first radiation image read-out apparatus in accordance with the present invention are based on these findings.

Conventional radiation image read-out apparatuses of this type are provided with only the single input means, which serves as both the first input means 3b and the second input means 3e. (The necessary items of information must be designated with the same timing.) Therefore, with the conventional radiation image read-out apparatuses, at the same time as when the information about the use of the region selecting mode is entered into the apparatuses, the information about which mean value operating region is to be used among a plurality of mean value operating regions, the information about the desired image signal range L, and the information about the desired reproduced image density D0 must be entered into the apparatuses.

The first radiation image read-out apparatus in accordance with the present invention is provided with the first input means 3b and the second input means 3e from which information can be entered with independent timing into the apparatus. Also, the first radiation image read-out apparatus in accordance with the present invention is provided with the display means 3c. Therefore, as defined in the method for operating the first radiation image read-out apparatus, before the preliminary readout is carried out, only the information about the use of the region selecting mode is entered from the first input means 3b into the apparatus. After the preliminary readout is carried out, an image represented by the preliminary read-out image signal obtained during the preliminary readout is displayed on the display means 3c. The mean value operating region is selected on the basis of the displayed image and designated. Therefore, even if an object image was recorded at a position different from an intended position on the stimulable phosphor sheet, a correct mean value operating region can be designated. Accordingly, a visible image having an appropriate image density level and an appropriate contrast can be reproduced.

The first input means 3b and the second input means 3e need not necessarily be constituted of two independent hardwares. It is only necessary that the functions of the first input means 3b and the second input means 3e are independent of each other.

Effects of the second radiation image read-out apparatus and the method for operating the second radiation image read-out apparatus in accordance with the present invention will be described hereinbelow.

Analyses of procedures for obtaining a visible image revealed that, in cases where the region selecting mode is used in a radiation image read-out apparatus utilizing a plurality of modes of adjusting the image processing conditions, including the region selecting mode, only the information about the use of the region selecting mode is necessary before the read-out operation is carried out. The information about which mean value operating region is to be used among a plurality of mean value operating regions, the information about the desired image signal range L, and the information about the desired reproduced image density D0 may be designated after the read-out operation has been carried out. The second radiation image read-out apparatus and the method for operating the second radiation image read-out apparatus in accordance with the present invention are based on these findings.

Conventional radiation image read-out apparatuses of this type are provided with only the single input means, which serves as both the first input means 13b and the second input means 13e. (The necessary items of information must be designated with the same timing.) Therefore, with the conventional radiation image read-out apparatuses, at the same time as when the information about the use of the region selecting mode is entered into the apparatuses, the information about which mean value operating region is to be used among a plurality of mean value operating regions, the information about the desired image signal range L, and the information about the desired reproduced image density D0 must be entered into the apparatuses.

The second radiation image read-out apparatus in accordance with the present invention is provided with the first input means 13b and the second input means 13e from which information can be entered with independent timing into the apparatus. Also, the second radiation image read-out apparatus in accordance with the present invention is provided with the display mean 13c. Therefore, as defined in the method for operating the second radiation image read-out apparatus, before the read-out operation is carried out, only the information about the use of the region selecting mode is entered from the first input means 13b into the apparatus. After the read-out operation is carried out, an image represented by the image signal obtained during the read-out operation is displayed on the display means 13c. The mean value operating region is selected on the basis of the displayed image and designated. Therefore, even if an object image was recorded at a position different from an intended position on the recording medium, a correct mean value operating region can be designated. Accordingly, a visible image having an appropriate image density level and an appropriate contrast can be reproduced.

The first input means 13b and the second input means 13e need not necessarily be constituted of two independent hardwares. It is only necessary that the functions of the first input means 13b and the second input means 13e are independent of each other.

DESCRIPTION OF THE PREFERRED EMBODIMENTS

The present invention will hereinbelow be described in further detail with reference to the accompanying drawings.

An embodiment of the present invention will be described, wherein a stimulable phosphor sheet is used and a preliminary readout is carried out.

Figure 2:
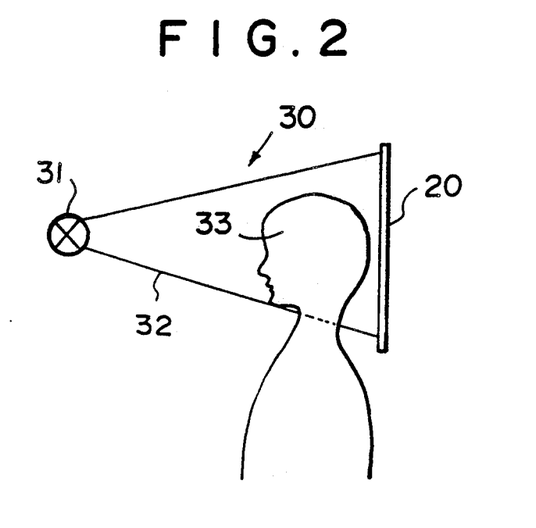
FIG. 2 is a schematic view showing an example of a radiation image recording apparatus.

FIG. 2 schematically shows an example of a radiation image recording apparatus.

With reference to FIG. 2, radiation 32 is produced by a radiation source 31 of a radiation image recording apparatus 30. The radiation 32 passes through an object 33 and then impinges upon a stimulable phosphor sheet 20. As a result, a radiation image of the object 33 is stored on the stimulable phosphor sheet 20.

FIG. 3 is an explanatory view showing an object image (radiation image) stored on the stimulable phosphor sheet 20.

By way of example, during the recording of a radiation image with the radiation image recording apparatus 30, the position of the object 33, the position of the stimulable phosphor sheet 20, or the like are adjusted such that an object image 21a may be stored at the center portion of the stimulable phosphor sheet 20, which portion is indicated by the chained line in FIG. 3. However, it often occurs that, because of low accuracy of adjustment, an object image 21b is actually stored at the right part of FIG. 3 indicated by the solid line. In FIG. 3, nine regions 22, 22, . . . indicated by the broken lines represent the mean value operating regions which are used in the region selecting mode.

Figure 4:
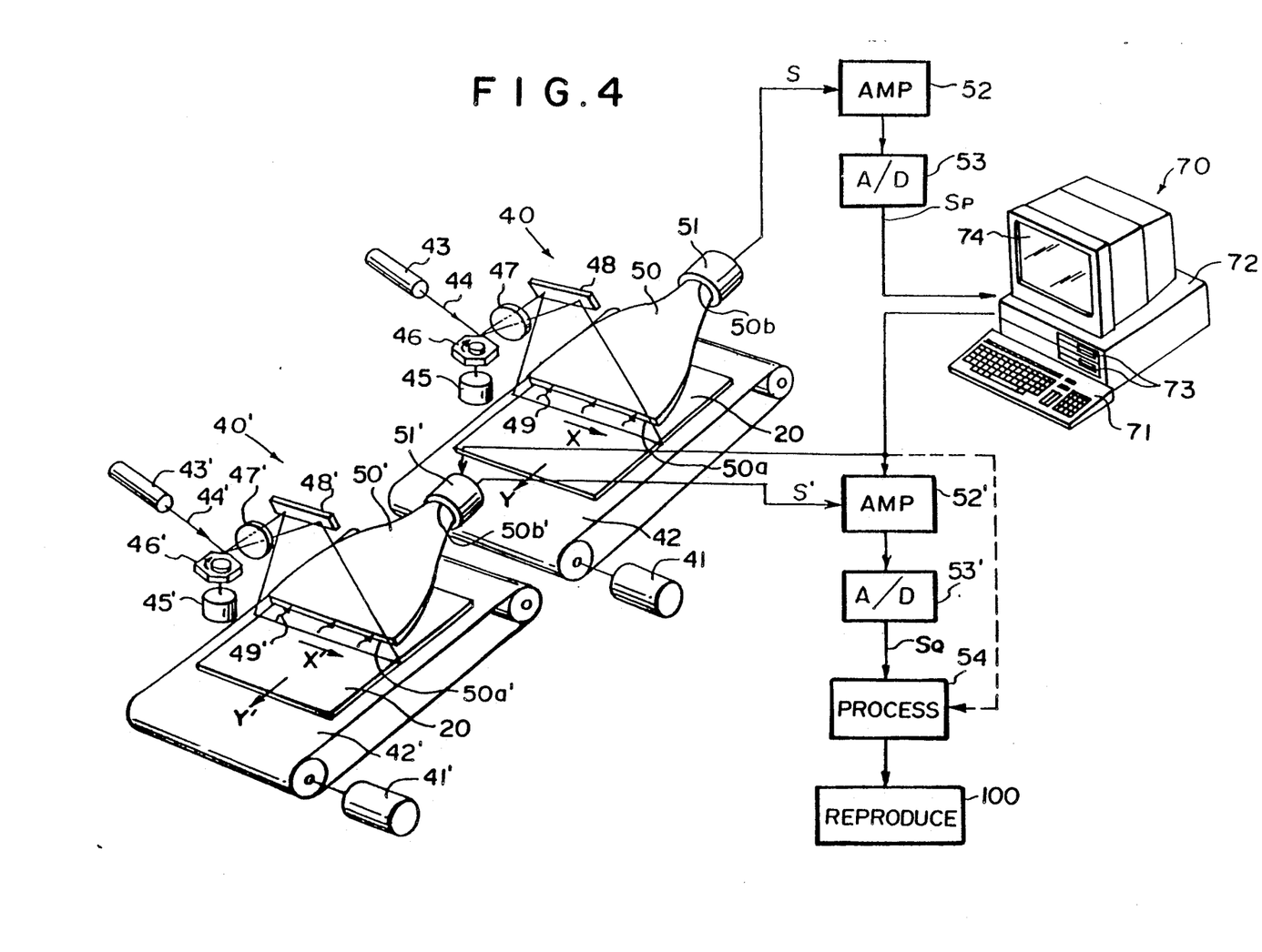
FIG. 4 is a perspective view showing an embodiment of the radiation image read-out apparatus in accordance with the present invention.

FIG. 4 is a perspective view showing an embodiment of the radiation image read-out apparatus in accordance with the present invention.

With reference to FIG. 4, a stimulable phosphor sheet 20 on which a radiation image has been stored is placed at a predetermined position in a preliminary read-out means 40 which carries out a preliminary readout by scanning the stimulable phosphor sheet 20 with a light beam having a low energy level, thereby releasing only part of the energy from the stimulable phosphor sheet 20, which energy was stored during its exposure to radiation.

Before or after the stimulable phosphor sheet 20 is placed in the preliminary read-out means 40, a command, which designates that the region selecting mode is to be used, is entered by an operator at a keyboard 71 of a computer system 70. The entering function of the keyboard 71 constitutes the first input means of the radiation image read-out apparatus in accordance with the present invention. It will be easy to know which function in the embodiment of FIG. 4 corresponds to which means of the radiation image read-out apparatus in accordance with the present invention. This embodiment is provided with various modes of adjusting the read-out conditions for the final readout, which will be described later. However, only the case wherein the region selecting mode, which is the subject of the present invention, is used will be described below.

After the stimulable phosphor sheet 20 is placed at the predetermined position in the preliminary read-out means 40 and the command, which designates that the region selecting mode is to be used, is entered at the keyboard 71, the stimulable phosphor sheet 20 is conveyed in a sub-scanning direction indicated by the arrow Y by a sheet conveyance means 42, which is constituted of an endless belt or the like and which is operated by a motor 41. A laser beam 44 which serves as stimulating rays and which has a low energy level is produced by a laser beam source 43, and is reflected and deflected by a rotating polygon mirror 46 which is quickly rotated by a motor 45 in the direction indicated by the arrow. The laser beam 44 then passes through a converging lens 47 constituted of an fθ lens or the like. The direction of the optical path of the laser beam 44 is then changed by a mirror 48, and the laser beam 44 impinges upon the stimulable phosphor sheet 20 and scans it in a main scanning direction indicated by the arrow X, which direction is approximately normal to the sub-scanning direction indicated by the arrow Y. When the stimulable phosphor sheet 20 is exposed to the laser beam 44, the exposed portion of the stimulable phosphor sheet 20 emits light 49 in an amount proportional to the amount of energy stored thereon during its exposure to radiation. The emitted light 49 is guided by a light guide member 50 and photoelectrically detected by a photomultiplier 51. The light guide member 50 is made from a light guiding material such as an acrylic plate and has a linear light input face 50a, positioned so that it extends along the main scanning line on the stimulable phosphor sheet 20, and a ring-shaped light output face 50b, positioned so that it is in close contact with a light receiving face of the photomultiplier 51. The emitted light 49, which has entered the light guide member 50 at its light input face 50a, is guided through repeated total reflection inside of the light guide member 50, emanates from the light output face 50b, and is received by the photomultiplier 51. In this manner, the amount of the emitted light 49, which amount represents the radiation image, is converted into an electric signal by the photomultiplier 51.

An analog output signal S generated by the photomultiplier 51 is logarithmically amplified by a logarithmic amplifier 52, and digitized by an A/D converter 53 into a preliminary read-out image signal SP.

In the preliminary readout, read-out conditions, such as the voltage applied to the photomultiplier 51 or the amplification factor of the logarithmic amplifier 52, are set so that image information can be detected accurately even if the amount of energy stored on the stimulable phosphor sheet 20 during its exposure to radiation varies over a wide range.

The obtained preliminary read-out image signal SP is fed into the computer system 70. The computer system 70 constitutes an example of the condition adjusting section 3 shown in FIG. 1A. The computer system 70 comprises the keyboard 71, at which necessary instructions, or the like, are fed into the computer system 70, a main body 72 in which a CPU and an internal memory are incorporated, a disk drive unit 73 which operates a floppy disk serving as a subsidiary memory, and a CRT display device 74 which displays an image represented by the preliminary read-out image signal SP and other necessary information.

After the preliminary read-out image signal SP is fed into the computer system 70, judgment is made as to whether the mode of adjusting the read-out conditions for the final readout from the preliminary read-out image signal SP is or is not the region selecting mode. In cases where it is judged that the region selecting mode has been designated to be used during the determination of the read-out conditions for the final readout, the image represented by the preliminary read-out image signal SP is displayed on the CRT display device 74. By way of example, the image shown in FIG. 3 is displayed on the CRT display device 74. The whole surface of the stimulable phosphor sheet 20 shown in FIG. 3 corresponds to the whole image display area of the CRT display device 74. An image corresponding to the object image 21b and the regions corresponding to the nine mean value operating regions 22, 22, . . . are displayed on the CRT display device 74. Therefore, the operator can view the image displayed on the CRT display device 74, and judge whether or not the object image was stored at the intended position on the stimulable phosphor sheet 20. Thereafter, the operator can determine which mean value operating region among the nine mean value operating regions 22, 22, ... should be used during the determination of the read-out conditions for the final readout. In this example, as shown in FIG. 3, the object image 21b was stored at the right part of the stimulable phosphor sheet 20 and therefore, rather than the mean value operating region 22a located at the center, the mean value operating region 22b located at the right part should be used during the determination of the read-out conditions for the final readout.

A command designating that the mean value operating region 22b shown in FIG. 3 should be used, the information about the desired image signal range L, and the information about the desired reproduced image density D0 are entered by the operator at the keyboard 71.

The function of the keyboard 71, with which the command designating the mean value operating region, the information about the desired image signal range L, and the information about the desired reproduced image density D0 are entered, constitutes an example of the second input means of the radiation image read-out apparatus in accordance with the present invention. After the command and the information have been entered, the mean value $\overline{Sb}$ of the preliminary read-out image signal SP corresponding to the mean value operating region 22b shown in FIG. 3 is calculated. The read-out conditions for the final readout are determined from the mean value $\overline{Sb}$, the desired image signal range L, and the desired reproduced image density D0. In this case, the mean value $\overline{Sb}$ corresponds to S0 shown in FIG. 6. Specifically, the read-out conditions for the final readout, such as the voltage applied to a photomultiplier 51' of a final read-out means 40', which will be described later, or the amplification factor of a logarithmic amplifier 52', are set such that during the final readout the image information represented by values of the emitted light signal falling within the range of S1 to S2, is detected as an image signal having values lying on the straight line G1 shown in FIG. 6. The computer system 70 generates signals which control the voltage applied to the photomultiplier 51', the amplification factor of a logarithmic amplifier 52', or the like.

The stimulable phosphor sheet 20, on which the preliminary readout has been finished, is placed at a predetermined position in the final read-out means 40', and the final readout is carried out. During the final readout, the stimulable phosphor sheet 20 is scanned with a laser beam 44' having an energy level higher than that of the laser beam 44 used during the preliminary readout. In this manner, an image signal SQ is detected under the read-out conditions which have been set in the manner described above. The configuration of the final read-out means 40' is nearly the same as that of the preliminary read-out means 40, and therefore elements corresponding to those constituting the preliminary read-out means 40 are numbered with corresponding primed reference numerals in FIG. 4.

After the image signal is digitized in an A/D converter 53', the resulting image signal SQ is fed into an image processing means 54, which carries out appropriate image processing on the image signal SQ. After being image processed, the image signal is fed into a reproducing apparatus 100, which reproduces a visible image from the image signal.

In the aforesaid embodiment, the read-out conditions for the final readout are set by the computer system 70. Alternatively, predetermined read-out conditions may be used when the final readout is carried out regardless of the characteristics of the preliminary read-out image signal SP. On the basis of the preliminary read-out image signal SP, the computer system 70 may calculate image processing conditions to be used in the image processing means 54 which carries out image processing on the image signal SQ. The image processing conditions calculated by the computer system 70 may then be fed into the image processing means 54 as indicated by the broken line in FIG. 4. As another alternative, the computer system 70 may determine both the read-out conditions and the image processing conditions. Also, the information about the desired reproduced image density D0, which is entered at the keyboard 71 may be fed into the reproducing apparatus 100 and used during the reproduction of the visible image.

In the embodiment described with reference to FIG. 4, the preliminary read-out means 40 and the final read-out means 40' are separate from each other. Alternatively, because the configurations of the preliminary read-out means 40 and the final read-out means 40' are approximately identical to each other, a single read-out means may be utilized for performing both the preliminary readout and the final readout. In this case, after the stimulable phosphor sheet 20 is subjected to the preliminary readout wherein it is scanned with a light beam having a low energy level, the stimulable phosphor sheet 20 may be moved back to the position at which image readout is started. Thereafter, the final readout image may be carried out by scanning the stimulable phosphor sheet 20 with a light beam having a high energy level.

In cases where a single read-out means is utilized to perform both the preliminary readout and the final read, it is necessary to change the intensity of the light beam used in the preliminary readout and the final readout. For this purpose, various methods may be employed as described above; for example, a laser beam source or the like may change the intensity of the light beam, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed in the main scanning direction or in the sub-scanning direction.

The aforesaid embodiment is applied when a preliminary readout is carried out. However, the radiation image read-out apparatus and the method for operating the radiation image read-out apparatus in accordance with the present invention is also applicable when no preliminary read-out operation is carried out, but only a read-out operation corresponding to the final read-out operation is carried out. In these cases, an image signal is obtained under predetermined read-out conditions. Based on the image signal, the image processing conditions are set.

The radiation image read-out apparatus and the method for operating the radiation image read-out apparatus in accordance with the present invention are not limited to the aforesaid embodiment wherein a stimulable phosphor sheet is used, and are also applicable when an X-ray image recorded on X-ray film, or the like, is read out.

Figures 5A, 5B:
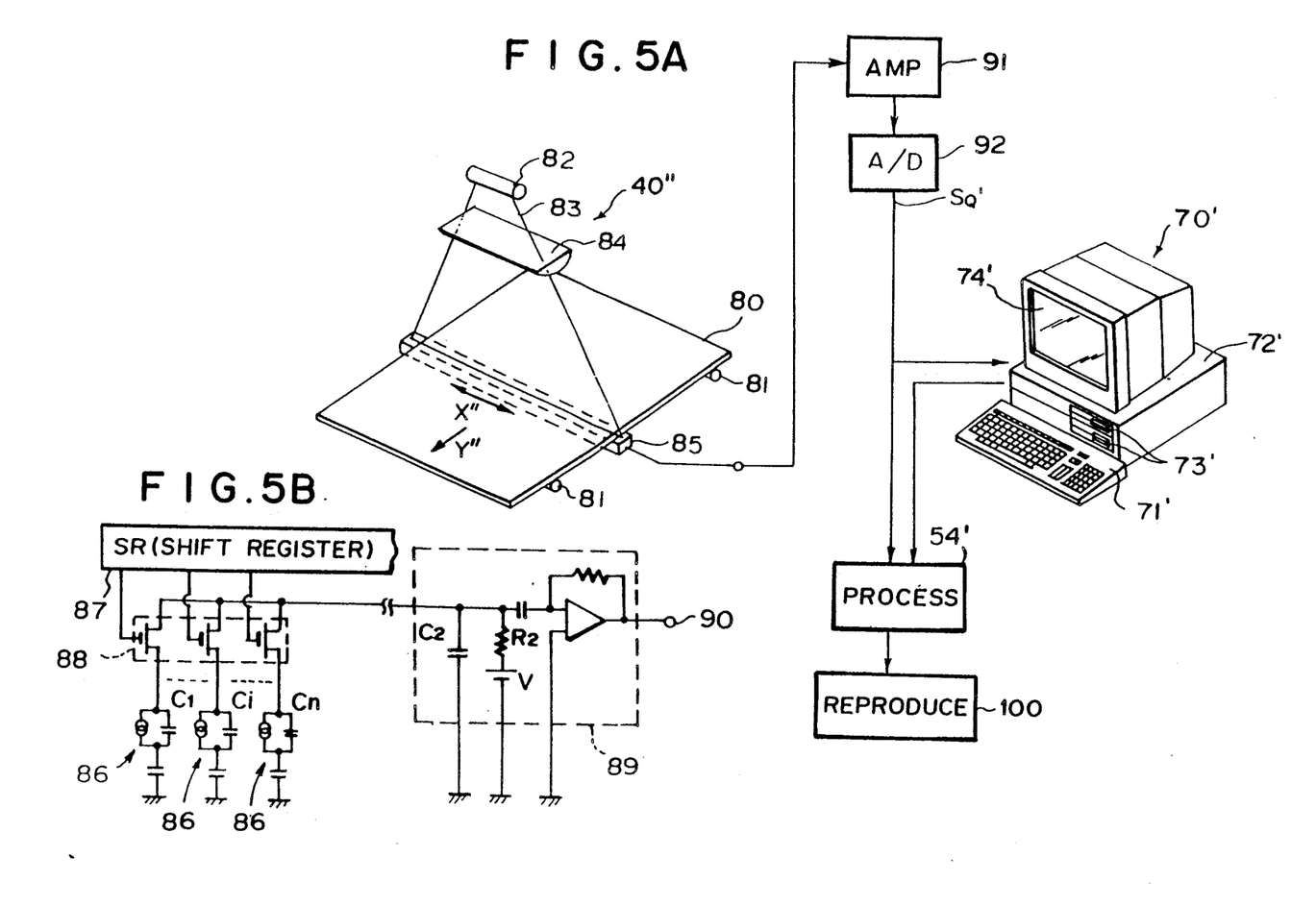
FIG. 5A is a perspective view showing an embodiment of the X-ray image read-out apparatus in accordance with the present invention, wherein an X-ray image recorded on X-ray film is read out.
FIG. 5B is a circuit diagram showing an equivalent circuit for a MOS sensor.

FIG. 5A is a perspective view showing an example of an X-ray image read-out apparatus wherein an X-ray image recorded on X-ray film is read out.

With reference to FIG. 5A, a sheet of X-ray film 80, on which an X-ray image has been recorded, is placed at a predetermined position and is conveyed in the direction indicated by the arrow Y" by a film conveyance means 81.

Reading light 83, which is produced by an elongated light source 82 extending in one direction, is converged by a cylindrical lens 84 and is linearly irradiated onto the X-ray film 80 along the directions indicated by the double-headed arrow X", which are approximately normal to the direction indicated by the arrow Y". A MOS sensor 85 is positioned below the X-ray film 80 so that the MOS sensor 85 can receive the reading light 83 which has passed through the X-ray film 80, the intensity of which light has been modulated in accordance with the X-ray image recorded on the X-ray film 80. The MOS sensor 85 comprises a plurality of solid state photoelectric conversion devices which are arrayed linearly at intervals equal to the intervals between the picture elements of the X-ray image along the directions indicated by the double-headed arrow X". As long as the X-ray film 80 is conveyed in the direction indicated by the arrow Y" while being exposed to the reading light 83, the MOS sensor 85 detects the reading light, which has passed through the X-ray film 80, at predetermined intervals corresponding to the intervals between the picture elements of the X ray image along the direction indicated by the arrow Y".

FIG. 5B is a circuit diagram showing an equivalent circuit for the MOS sensor 85.

With reference to FIG. 5B, photocarriers generated when the reading light 83 impinges upon the solid state photoelectric conversion devices 86, 86, . . . accumulate in capacitors $C_i$ ($i = 1, 2, \ldots, n$) of the solid state photoelectric conversion devices 86, 86, . . . The switches of a switch section 88 are turned on and off sequentially, which allows the number of photocarriers which have accumulated in the capacitors $C_i$ to be detected. A shift register 87 controls the switches of the switch section 88, and a time-serial image signal is obtained. The image signal is then amplified by a preamplifier 89 and is output at an output terminal 90 of the pre-amplifier 89.

The analog image signal output by the MOS sensor 85 is logarithmically amplified by a logarithmic amplifier 91 and digitized into an image signal SQ' by an A/D converter 92.

The image signal SQ' generated by the A/D converter 92 is fed into a computer system 70' and an image processing means 54'. Elements constituting the computer system 70' are basically equivalent to those constituting the computer system 70 shown in FIG. 4, and are therefore numbered with corresponding primed reference numerals in FIG. 5A. On the basis of the image signal SQ', the computer system 70' determines the image processing conditions which is to be used when image processing is carried out on the image signal SQ'. The determined image processing conditions are fed into the image processing means 54', which carries out the image processing on the image signal SQ' under the set image processing conditions. The image signal obtained from the image processing means 54' is fed into a reproducing apparatus 100, which reproduces a visible X-ray image from the image signal.

In the embodiment shown in FIG. 5A, the MOS sensor 85 may be replaced by a charge coupled device (CCD) or a charge priming device (CPD). Also, during the readout of the X-ray image from the X-ray film 80, the X-ray film 80 may be two-dimensionally scanned with a light beam in the same manner as that described above for image readout from a stimulable phosphor sheet Furthermore, instead of light which has passed through the X-ray film 80 being detected, light reflected by the X ray film 80 may be detected.

The radiation image read-out apparatus and the method for operating the radiation image read-out apparatus in accordance with the present invention are applicable widely when an image signal is obtained by reading out a radiation image from a recording medium, on which the radiation image has been recorded, and image processing is carried out on the image signal.

We claim:

1. A radiation image read-out apparatus comprising:
   (i) a read-out section provided with:
      a preliminary read-out means for carrying out a preliminary read-out operation wherein a stimulable phosphor sheet having a radiation image stored thereon is exposed to stimulating rays, which cause said stimulable phosphor sheet to release part of energy stored thereon during its exposure to radiation as light emitted in proportion to the amount of said stored energy, and the emitted light is detected, and obtaining a preliminary read-out image signal which approximately represents said radiation image, and
      a final read-out means for carrying out a final read-out operation wherein said stimulable phosphor sheet is exposed to stimulating rays having an energy level higher than that of said stimulating rays used during the preliminary read-out operation, and light emitted by said stimulable phosphor sheet during its exposure to the stimulating rays is detected, and obtaining a final readout image signal which represents said radiation image,
   (ii) an image processing section provided with an image processing means for carrying out image processing on said final read-out image signal, and
   (iii) a condition adjusting section which is provided with a plurality of modes of adjusting read-out conditions for the final read-out operation and/or image processing conditions to be used during the image processing, including a region selecting mode, said adjustment being effected on the basis of a mean-level value of said preliminary read-out image signal corresponding to a single region selected from among a plurality of regions on said stimulable phosphor sheet, and in which the read-out conditions for the final readout and/or the image processing conditions are determined in a mode selected from among the plurality of said modes of adjusting the read-out conditions for the final readout and/or the image processing conditions, wherein said condition adjusting section is constituted of:
      (a) a condition operating means for determining the read-out conditions for the final readout and/or the image processing conditions and feeding the information about the determined read-out conditions for the final readout into said final read-out means and/or feeding the information about the determined image processing conditions into said image processing means,
      (b) a first input means with which a mode selected from among the plurality of said modes of adjusting the read-out conditions for the final readout and/or the image processing conditions is designated, and from which the information about the designated mode is fed into said condition operating means,
      (c) a display means for displaying an image represented by said preliminary read-out image signal,
      (d) a judgment means for judging whether said region selecting mode has been or has not been designated, and
      (e) a second input means with which a region to be used during the determination of the read-out conditions for the final readout and/or the image processing conditions, said region being selected from among the plurality of said regions on said stimulable phosphor sheet, a desired reproduced image density corresponding to the mean-level value of said preliminary read-out image signal corresponding to said region, and a desired image signal range including said mean-level value are designated with the timing independent of the designation of a mode effected with said first input means, and from which the information about said region, the information about said desired reproduced image density, and the information about said desired image signal range are fed into said condition operating means.

2. An apparatus as defined in claim 1 wherein said stimulating rays are a laser beam.

3. A method for operating a radiation image read-out apparatus as defined in claim 1, which comprises the steps of:
   (i) before the preliminary read-out operation is carried out, designating said region selecting mode with said first input means,
   (ii) after the preliminary read-out operation is carried out but before the final readout is carried out, making judgment with said judgment means as to whether said region selecting mode has been or has not been designated,
   (iii) in cases where it is judged by said judgment means that said region selecting mode has been designated, displaying an image, which is represented by said preliminary read-out image signal, on said display means, (iv) after the image is displayed, designating with said second input means:

said region to be used during the determination of the read-out conditions for the final readout and/or the image processing conditions, said region being selected from among the plurality of said regions on said stimulable phosphor sheet, a desired reproduced image density corresponding to the mean-level value of said preliminary read-out image signal corresponding to said region, and a desired image signal range including said mean-level value, and (v) thereafter carrying out the final read-out operation.

4. A radiation image read-out apparatus comprising:
(i) a read-out section provided with a read-out means for carrying out a read-out operation wherein a radiation image is read out from a recording medium, on which the radiation image has been recorded, and obtaining an image signal representing said radiation image,
(ii) an image processing section provided with an image processing means for carrying out image processing on said image signal, and
(iii) a condition adjusting section which is provided with a plurality of modes of adjusting image processing conditions to be used during the image processing, including a region selecting mode, said adjustment being effected on the basis of a mean-level value of said image signal corresponding to a single region selected from among a plurality of regions on said recording medium, and in which the image processing conditions are determined in a mode selected from among the plurality of said modes of adjusting the image processing conditions, wherein said condition adjusting section is constituted of:
(a) a condition operating means for determining the image processing conditions and feeding the information about the determined image processing conditions into said image processing means,
(b) a first input means with which a mode selected from among the plurality of said modes of adjusting the image processing conditions is designated, and from which the information about the designated mode is fed into said condition operating means,
(c) a display means for displaying an image represented by said image signal,
(d) a judgment means for judging whether said region selecting mode has been or has not been designated, and
(e) a second input means with which a region to be used during the determination of the image processing conditions, said region being selected from among the plurality of said regions on said recording medium, a desired reproduced image density corresponding to the mean-level value of said image signal corresponding to said region, and a desired image signal range including said mean-level value are designated with the timing independent of the designation of a mode effected with said first input means, and from which the information about said region, the information about said desired reproduced image density, and the information about said desired image signal range are fed into said condition operating means.

5. An apparatus as defined in claim 4 wherein said recording medium is a stimulable phosphor sheet on which a radiation image has been stored 6. An apparatus as defined in claim 5 wherein said image signal is obtained from a read-out operation wherein said stimulable phosphor sheet is exposed to stimulating rays, which cause said stimulable phosphor sheet to emit light in proportion to the amount of energy stored thereon during its exposure to radiation, and the emitted light is detected photoelectrically.

7. An apparatus as defined in claim 6 wherein said stimulating rays are a laser beam.

8. An apparatus as defined in claim 4 wherein said recording medium is photographic film.

9. A method for operating a radiation image read-out apparatus as defined in claim 4, which comprises the steps of:
(i) before the read-out operation is carried out, designating said region selecting mode with said first input means,
(ii) after the read-out operation is carried out but before the image processing is carried out, making judgment with said judgment means as to whether said region selecting mode has been or has not been designated,
(iii) in cases where it is judged by said judgment means that said region selecting mode has been designated, displaying an image, which is represented by said image signal, on said display means,
(iv) after the image is displayed, designating with said second input means:
said region to be used during the determination of the image processing conditions, said region being selected from among the plurality of said regions on said recording medium,
a desired reproduced image density corresponding to the mean-level value of said image signal corresponding to said region, and
a desired image signal range including said mean-level value, and
(v) thereafter carrying out the image processing.

* * * * *